United States Patent
Troutman

(10) Patent No.: US 7,458,114 B2
(45) Date of Patent: Dec. 2, 2008

(54) CLIPS FOR MOUNTING ACCESSORIES TO PLAY YARDS AND METHODS OF OPERATING THE SAME

(75) Inventor: Damon Oliver Casati Troutman, Lake Forest, IL (US)

(73) Assignee: Kolcraft Enterprises, Inc., Chicago, IL (US)

(*) Notice: Subject to any disclaimer, the term of this patent is extended or adjusted under 35 U.S.C. 154(b) by 50 days.

(21) Appl. No.: 11/101,822

(22) Filed: Apr. 8, 2005

(65) Prior Publication Data

US 2006/0225205 A1    Oct. 12, 2006

(51) Int. Cl.
  A47D 7/00    (2006.01)
  A47D 13/00   (2006.01)
  A47D 15/00   (2006.01)
(52) U.S. Cl. ............... 5/93.1; 5/93.2; 24/460; 248/230.7; 248/229.16; 248/229.26; 403/232.1; 403/237; 403/329
(58) Field of Classification Search ............ 5/93.1, 5/93.2, 94, 503.1, 507.1, 95; 24/460, 462; 248/214, 230.7, 229.16, 229.26, 103, 100, 248/101; 403/232.1, 237, 329, 226
See application file for complete search history.

(56) References Cited

U.S. PATENT DOCUMENTS

| | | | | |
|---|---|---|---|---|
| 607,096 A * | 7/1898 | Thacher | ............... | 248/215 |
| 1,187,845 A * | 6/1916 | Kolb | ............... | 248/102 |
| 1,407,681 A * | 2/1922 | Saunders | ............... | 248/103 |
| 1,695,571 A | 12/1928 | Baxter | | |
| 1,753,875 A * | 4/1930 | Baumann | ............... | 248/103 |
| 1,839,580 A | 6/1932 | Myron | | |
| 1,975,332 A | 10/1934 | Rehkoff | | |
| 2,015,280 A * | 9/1935 | Morishita | ............... | 248/451 |
| 2,287,907 A | 6/1942 | Schettler, Jr. | | |
| 2,415,186 A * | 2/1947 | Moore | ............... | 248/103 |
| D158,030 S | 4/1950 | Wagner | | |
| 2,617,999 A | 11/1952 | Mitchell | | |
| 2,698,443 A | 1/1955 | Ralick | | |
| 2,784,420 A | 3/1957 | Moltane | | |
| 2,790,184 A * | 4/1957 | Testa | ............... | 5/118 |
| 2,873,458 A | 2/1959 | Adamson | | |
| 3,018,493 A | 1/1962 | Wittbrodt | | |
| RE25,195 E | 7/1962 | Hamilton | | |
| 3,064,277 A | 11/1962 | Gill | | |
| 3,092,847 A | 6/1963 | Puy | | |
| 3,095,583 A | 7/1963 | Golub et al. | | |
| 3,103,670 A | 9/1963 | Landry | | |
| 3,120,368 A * | 2/1964 | Crisp | ............... | 248/103 |

(Continued)

OTHER PUBLICATIONS

Prior Art, Century Products Co. Instruction Manual "Fold-n-go Care Center", 12 pages, date not available.

*Primary Examiner*—Alexander Grosz
(74) *Attorney, Agent, or Firm*—Hanley, Flight & Zimmerman LLC.

(57) ABSTRACT

Clips for securing one or more accessories to a play yard or crib and methods of operating the same are disclosed. A disclosed example includes a first engagement member, a second engagement member, and a first joining member joining the first and second engagement members. The first and second engagement members are joined in a spaced apart relation such that a distance between the first and second engagement members is less than a diameter of the rail.

51 Claims, 9 Drawing Sheets

U.S. PATENT DOCUMENTS

| | | | |
|---|---|---|---|
| 3,158,876 A | 12/1964 | Gottlieb | |
| 3,162,865 A | 12/1964 | Tigrett | |
| 3,183,528 A | 5/1965 | Jacobs et al. | |
| 3,187,352 A | 6/1965 | Gottlieb | |
| 3,233,254 A | 2/1966 | Golub et al. | |
| 3,289,986 A * | 12/1966 | Martin | 248/103 |
| 3,546,721 A | 12/1970 | Cleary | |
| 3,706,105 A | 12/1972 | Nicholas et al. | |
| D244,890 S | 7/1977 | Adams | |
| 4,376,318 A | 3/1983 | Cirillo | |
| 4,561,138 A | 12/1985 | Hwang | |
| 4,900,011 A | 2/1990 | Nolet | |
| 5,042,769 A * | 8/1991 | Smed | 248/231.81 |
| 5,197,154 A | 3/1993 | Shamie | |
| 5,211,498 A | 5/1993 | Huang | |
| 5,239,714 A | 8/1993 | Huang | |
| D339,922 S | 10/1993 | Williams | |
| 5,274,863 A | 1/1994 | Fountain | |
| 5,279,006 A | 1/1994 | Teng | |
| 5,307,531 A | 5/1994 | Kao | |
| 5,339,470 A | 8/1994 | Shamie | |
| 5,349,709 A | 9/1994 | Cheng | |
| 5,367,725 A | 11/1994 | Tsai | |
| 5,381,570 A | 1/1995 | Cheng | |
| 5,504,951 A | 4/1996 | Yeh | |
| 5,513,399 A | 5/1996 | Weng | |
| 5,553,336 A | 9/1996 | Mariol | |
| 5,560,055 A | 10/1996 | Ziegler | |
| 5,581,827 A | 12/1996 | Fong et al. | |
| 5,615,427 A | 4/1997 | Huang | |
| D382,718 S | 8/1997 | Mariol | |
| 5,761,755 A | 6/1998 | Huang | |
| 5,778,465 A | 7/1998 | Myers | |
| D397,882 S | 9/1998 | Wu | |
| 5,826,285 A | 10/1998 | Mariol et al. | |
| 5,867,850 A | 2/1999 | Mariol | |
| 5,867,851 A | 2/1999 | Mariol et al. | |
| D409,411 S | 5/1999 | Mariol et al. | |
| D413,025 S | 8/1999 | Mariol et al. | |
| 5,991,944 A | 11/1999 | Yang | |
| 6,041,455 A | 3/2000 | Raffo et al. | |
| 6,173,462 B1 | 1/2001 | Huang et al. | |
| 6,192,535 B1 | 2/2001 | Warner et al. | |
| 6,233,759 B1 | 5/2001 | Warner, Jr. et al. | |
| 6,256,814 B1 | 7/2001 | Drobinski | |
| D448,218 S | 9/2001 | Celestina-Krevh | |
| 6,332,231 B1 * | 12/2001 | Wang | 5/507.1 |
| 6,385,800 B1 | 5/2002 | Chen et al. | |
| 6,434,767 B1 * | 8/2002 | Welsh, Jr. | 5/93.2 |
| 6,543,070 B2 | 4/2003 | Longenecker et al. | |
| 6,615,424 B1 | 9/2003 | Cheng | |
| 6,665,895 B1 | 12/2003 | St. Pierre et al. | |
| 6,721,971 B1 | 4/2004 | Cheng | |
| D494,393 S | 8/2004 | Chen | |
| D500,213 S | 12/2004 | DeHart et al. | |
| 6,859,957 B1 | 3/2005 | Chen | |
| 6,895,611 B2 | 5/2005 | Tharalson et al. | |
| 6,948,197 B1 | 9/2005 | Chen | |
| 6,954,949 B1 | 10/2005 | Chen | |
| 6,959,462 B2 | 11/2005 | Chen | |
| 7,003,821 B2 | 2/2006 | DeHart et al. | |
| 7,020,914 B2 | 4/2006 | Miyakawa | |
| 7,043,779 B2 | 5/2006 | Mendenhall et al. | |
| 2003/0177575 A1 | 9/2003 | Cheng et al. | |
| 2004/0261174 A1 | 12/2004 | DeHart et al. | |
| 2005/0144716 A1 | 7/2005 | Chen | |
| 2005/0144717 A1 | 7/2005 | Chen | |
| 2005/0144718 A1 | 7/2005 | Miyakawa | |
| 2005/0229308 A1 | 10/2005 | Chen | |
| 2006/0037137 A1 | 2/2006 | Song | |
| 2006/0225207 A1 * | 10/2006 | Johnson | 5/98.1 |

\* cited by examiner

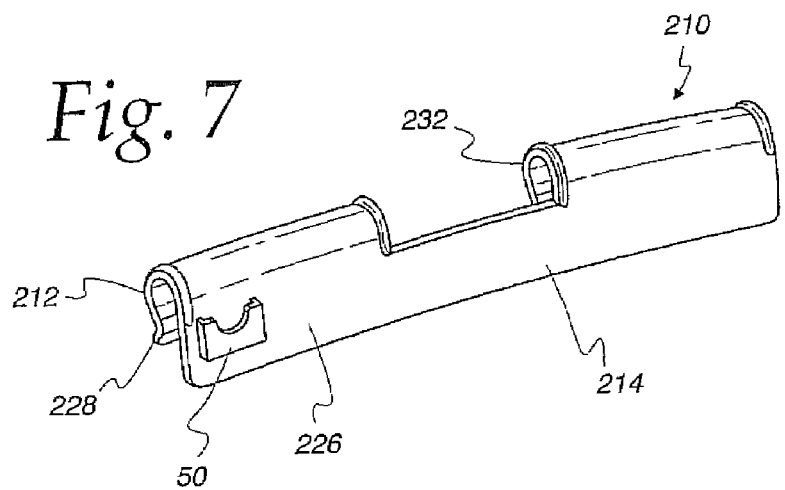
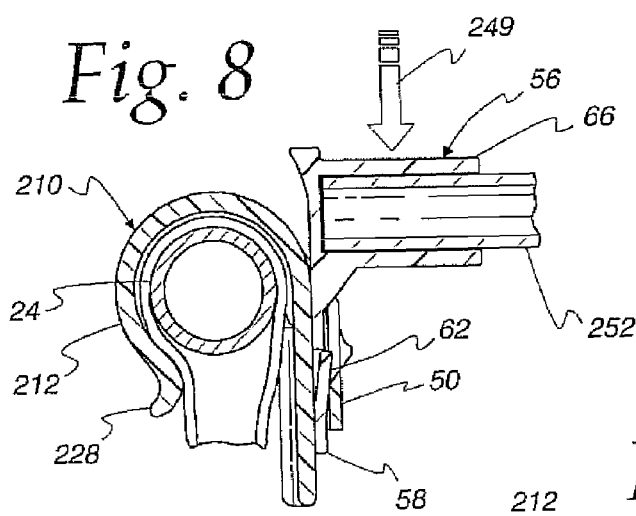
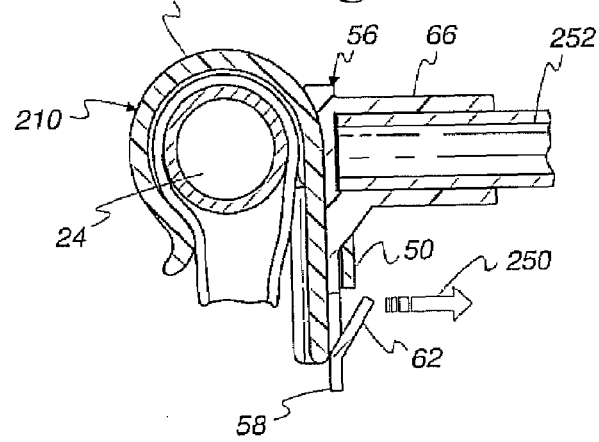

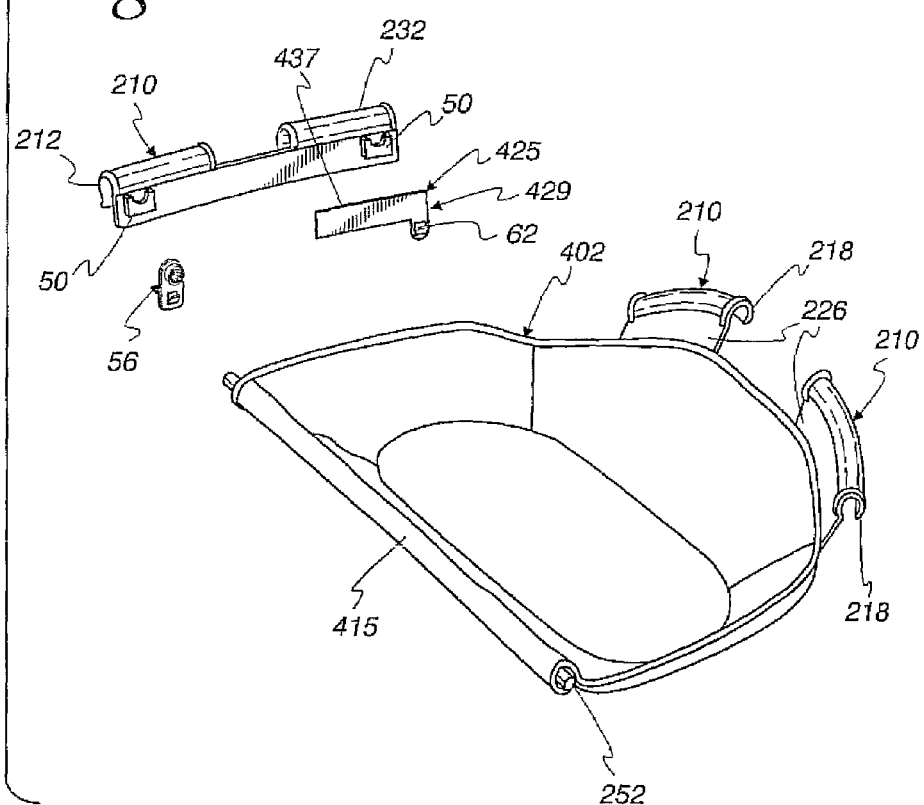

CLIPS FOR MOUNTING ACCESSORIES TO PLAY YARDS AND METHODS OF OPERATING THE SAME

FIELD OF THE DISCLOSURE

This disclosure relates generally to childcare products, and, more particularly, to clips for mounting accessories to play yards or cribs and methods of operating the same.

BACKGROUND

In recent years, portable play yards have become very popular. Portable play yards typically include a frame, a flexible enclosure supported by the frame, and a removable floor board or mat. The frame is largely or completely contained within the flexible enclosure so that there are few, if any, loose parts when the frame is collapsed or when the frame is erected. When collapsed, the portable play yard typically has a compact form factor to enable easy transport and storage of the play yard. Sometimes, the floorboard is wrapped around the collapsed frame to prevent the frame from inadvertently leaving the fully collapsed state during transport or storage. A play yard of this type is the play yard sold by Kolcraft Enterprises under the trademark Travelin' Tot®.

The floor of a portable play yard is typically located a few inches above the ground surface on which the play yard is erected. Therefore, in the weeks immediately following birth, it may not be comfortable for a new mother to bend to place an infant on the floor. Further, it would be very difficult to change the clothing and/or the diaper of a small child lying on the floor of a play yard. Accordingly, bassinets and changing tables have been developed for use with portable play yards.

These bassinets and changing tables typically include a plurality of clips or hooks that are structured to releasably engage the top rails of the portable play yard such that the corresponding bassinet or changing table is suspended within the play yard a distance above the floor of the play yard. In particular, the floor of the bassinet and/or changing table is located at a height to facilitate easy access to the bassinet and/or changing table by a standing adult. As a result, a child can be easily placed into such a bassinet/changing table without requiring the adult to significantly bend or kneel. Further, the clothing of a child located in one of these bassinets or changing tables can be comfortably changed by a standing adult, again without significant bending or kneeling.

BRIEF DESCRIPTION OF THE DRAWINGS

FIG. 6b is a cross-sectional view of the example rockable connector of FIG. 6a taken along line 6c-6c line of FIG. 6a.

FIG. 7 an enlarged perspective view of another example primary clip constructed in accordance with the teachings of the invention.

FIG. 8 is a cross-sectional view of the example primary clip of FIG. 7 shown secured on an example rail of an upper frame of an example play yard as an example accessory is being attached to the primary clip.

FIG. 9 is a view similar to FIG. 8, but showing the primary clip after the accessory has been attached.

FIG. 13 is an exploded view of the changing table of FIG. 12.

DETAILED DESCRIPTION

In this patent, the term "primary clip" is used to refer to any connector to releasably suspend an object from the upper edge of a play yard or crib. Also, in this patent the terms "mounting clip" and "accessory mounting clip" are used interchangeably to refer to any connector to mount a stationary or rocking accessory to a primary clip.

Figure 1:
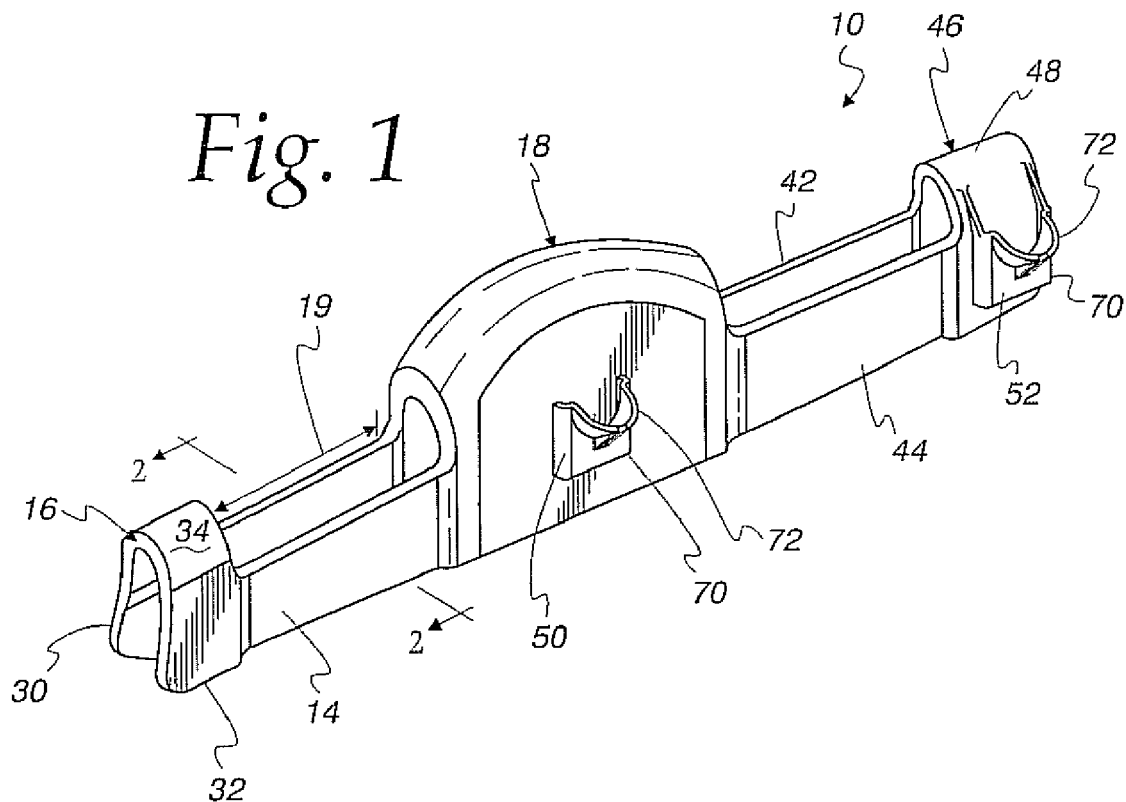
FIG. 1 is a perspective view of an example primary clip constructed in accordance with the teachings of the invention.

FIG. 1 illustrates an example primary clip 10 constructed in accordance with the teachings of the invention. The primary clip 10 of FIG. 1 is structured to secure one or more accessories to a top rail of a play yard or crib. As explained in detail below, the primary clip 10 is constructed to have improved retention characteristics compared to prior art clips. In particular, the amount of force required to disengage the primary clip 10 from the top rail of a play yard is higher in the example primary clip 10 of FIG. 1 than in known prior art clips.

In order to firmly secure the primary clip 10 to a rail of a play yard, the primary clip 10 is provided with engagement members 12, 14. In the illustrated example, the engagement members 12, 14 are implemented as two spaced apart, substantially parallel walls 12, 14.

To join the engagement members 12, 14 in spaced apart, substantially parallel relation, the primary clip 10 is further provided with a pair of joining members 16, 18. The joining member 16 joins a first set of the ends of the engagement members 12, 14 while the joining member 18 joins the opposite ends of the engagement members 12, 14. The joining member 16 of the illustrated example is implemented by a living hinge 16 that may be flexed to adjust the distance between the engagement members 12, 14 for mounting and dismounting the primary clip 10 from a rail of a play yard. The joining member 18 of the illustrated example is implemented by a hub 18 which is not intended to be flexed. Persons of ordinary skill in the art will appreciate, however, that the hub 18 may be replaced by a living hinge 16, if desired.

Figure 10:
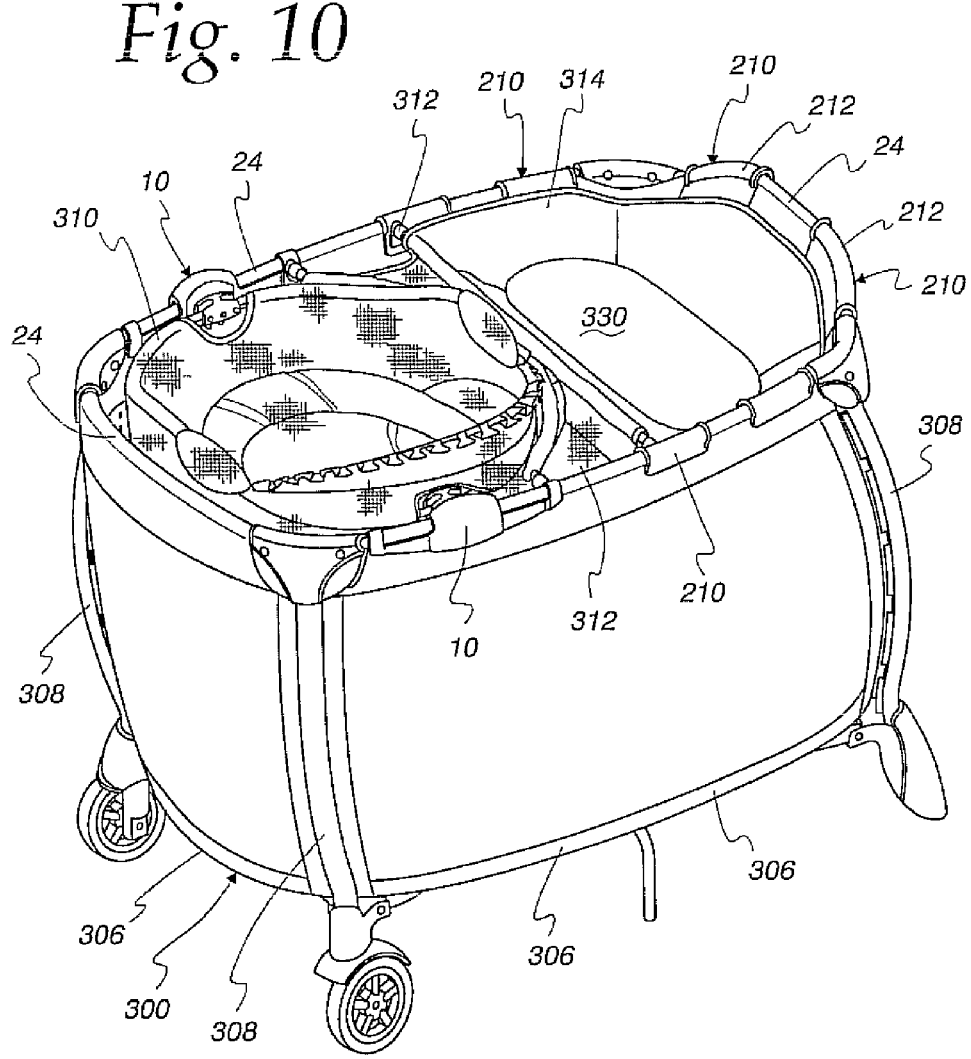
FIG. 10 is a perspective view of an example play yard shown with three example accessories secured on the upper frame rails by the example primary clips and the example mounting clips of FIGS. 1-5a and 7-9.

Irrespective of whether the joining member 18 is implemented by a hub 18 as shown in the illustrated example, or by another living hinge 16, the joining members 16, 18 are preferably separated a distance 19 corresponding to the lengths of the engagement members 12, 14. As shown in FIG. 1, the joining members 16, 18 of the illustrated example, include arched members disposed a distance above the top surfaces of the engagement members 12, 14. Thus, the inner surfaces of the joining members 16, 18 and the top surfaces of the engagement members 12, 14 define an opening to receive a rail of a play yard as shown in FIGS. 2 and 10.

Figure 2:
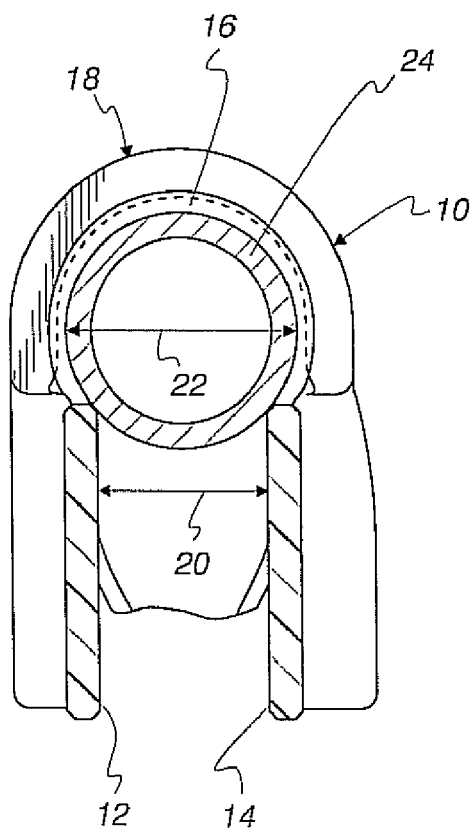
FIG. 2 is a cross-sectional view of the example primary clip of FIG. 1 taken along line 2-2 of FIG. 1, and showing the primary clip secured on a rail of an example upper frame of an example play yard.

In the example of FIG. 2, the illustrated joining members 16, 18 join the engagement members 12, 14 such that, when the living hinge 16 is in its unflexed (i.e., rest) state, the distance 20 between the engagement members 12, 14 is less than the diameter 22 of a rail 24 of a play yard with which the primary clip 10 is intended to be used. As a result, when the living hinge 16 is in its unflexed state and the primary clip 10 is mounted on the rail 24 of a play yard (i.e., the rail is in the opening defined by the joining members 16, 18 and the upper surfaces of the engagement members 12, 14), the joining members 16, 18 overlie the rail 24 while the engagement members 12, 14 are positioned beneath the rail 24. Preferably, the engagement members 12, 14 engage a lower surface of the rail 24 at a position spaced inward from the vertical tangents of the rail 24. Consequently, the engagement members 12, 14 can only be removed by flexing the living hinge 16 sufficiently to separate the engagement members 12, 14 a distance greater than the diameter 22 of the rail 24 while moving the primary clip 10 away from the rail 24. Because the engagement members 12, 14 engage the bottom of the rail 24, the primary clip 10 tightly clamps on the rail 24 and a chance of the primary clip 10 (and, thus, an accessory mounted to the clip 10,) slipping from the rail 24 is decreased.

In the example of FIG. 2, the joining members 16, 18 and the engagement members 12, 14 are integrally formed of a resilient material such as molded plastic. Further, the joining member 16 includes opposed side walls 30, 32 that are joined by a cross member 34. The side wall 30 is integrally formed with the engagement member 12. The side wall 32 is integrally formed with the engagement member 14. Preferably, when the joining member 16 is in its unflexed state, the distance between the side walls 30, 32 is greater than the distance between the engagement members 12, 14. However, it will be appreciated that the joining member 16 need not flare out relative to the engagement members 12, 14 as in the illustrated example, but, instead, the distance between the side walls 30, 32 of the joining member 16 and the distance between the engagement members 12, 14 could be substantially identical when the joining member 16 is not flexed.

To facilitate mounting and dismounting of the primary clip 10 to/from the rail 24 of a play yard, in the example of FIG. 1 the side wall 30 of the joining member 16 flares outward to provide a grip that may be grasped. The flared opening makes it easier to locate the clip 10 on the top rail 24. By grasping and pulling the grip 30 outward, a user can increase the distance between the engagement members 12, 14 to a length greater than the diameter of the rail 24. Then the engagement members 12, 14 and the entire clip 10 can be easily removed from the top rail 24.

As mentioned above, the joining member 18 may be implemented by a living hinge similar or identical to joining member 16. However, in the illustrated example, the joining member 18 is implemented by a hub 18. One side of the hub 18 joins the engagement members 12, 14. To further enhance the retention capability of the primary clip 10, the second side of the hub 18 joins the ends of a second pair of engagement members 42, 44. In the illustrated example, the ends of the engagement members 42, 44 opposite the hub 18 are joined by a third joining member 46. In the illustrated example, the third joining member 46 is structured to be substantially similar or identical to the joining member 16, and the engagement members 42, 44 are structured to be substantially similar or identical to the engagement members 12, 14. Persons of ordinary skill in the art will appreciate that the engagement members 42, 44 are not necessarily the exact same lengths as the engagement members 12, 14 (i.e., the primary clip 10 need not be symmetrical). Engagement members 12, 14, 42, 44 of varying lengths can be used to accommodate differently sized accessories. Regardless of the lengths of the engagements members 12, 14, 42, 44, the engagement members 42, 44 and the joining member 46 function substantially identically to the engagement members 12, 14 and the joining member 16. For example, as with the engagement members 12, 14, the engagement members 42, 44 are spaced apart a distance less than the diameter 22 of the rail 24 when the living hinge 46 is in an unflexed state. Further, when the primary clip 10 is mounted to the rail 24 of a play yard, the engagement members 42, 44 are positioned below the rail 24 just inside of the vertical tangents of the rail 24, while the cross-member 48 of the joining member 46 overlies the rail 24.

Persons of ordinary skill in the art will appreciate that one or more accessories may be coupled to the joining members 16, 18, and/or 46 and/or to the engagement members 12, 14, 42, and/or 44 such that, when the primary clip 10 is mounted to the rail 24 of a play yard, the accesor(ies) are suspended from that rail 24. The accessor(ies) may be coupled to the joining members 16, 18, and/or 46, and/or to the engagement members 12, 14, 42, and/or 44 by, for example, joining a portion of the soft goods of the accessor(ies) to those structures. The soft goods (e.g., a fabric or plastic material forming a portion of a bassinet, changing table, cradle, storage compartment, etc.) may be coupled to the joining members 16, 18, and/or 46 and/or to the engagement members 12, 14, 42, and/or 44 by mechanical fasteners (e.g., sewing, rivets, etc.) or chemical fasteners (e.g., glue, heat fusing, etc.). Persons of ordinary skill in the art will appreciate that the accessories may be coupled to any portion (i.e., the top, middle, or bottom) of the inner or outer walls of the joining members 16, 18, and/or 46, and/or of the engagement members 12, 14, 42, and/or 44 of the primary clip 10, depending upon the structure and need of the accessory.

Moreover, to facilitate coupling of one or more accessories to the primary clip 10, the illustrated primary clip 10 is further provided with accessory brackets 50, 52. Although two accessory brackets 50, 52 are shown in the example of FIG. 1, persons of ordinary skill in the art will readily appreciate that other numbers (e.g., 0, 1, 3, etc.) of brackets 50, 52 may alternatively be employed. Further, although in the illustrated example, one of the mounting brackets 50 is located on the hub 18 and the second of the brackets 52 is located on the joining member 46, persons of ordinary skill in the art will readily appreciate that the brackets 50, 52 could alternatively be located on different areas of the primary clip 10. The brackets 50, 52 are used to couple one or more accessories, (e.g., a bassinet, a changing table, a cradle, a storage compartment, etc) to the primary clip 10. As discussed below, these accessor(ies) may be in addition to one or more accessories coupled directly to the walls of the primary clip 10 as described in paragraph [0029], or in lieu of such directly connected accessories. The use of the brackets 50, 52 is particularly advantageous for removably connecting accessories to the primary clip 10 as explained further below.

Figure 3:
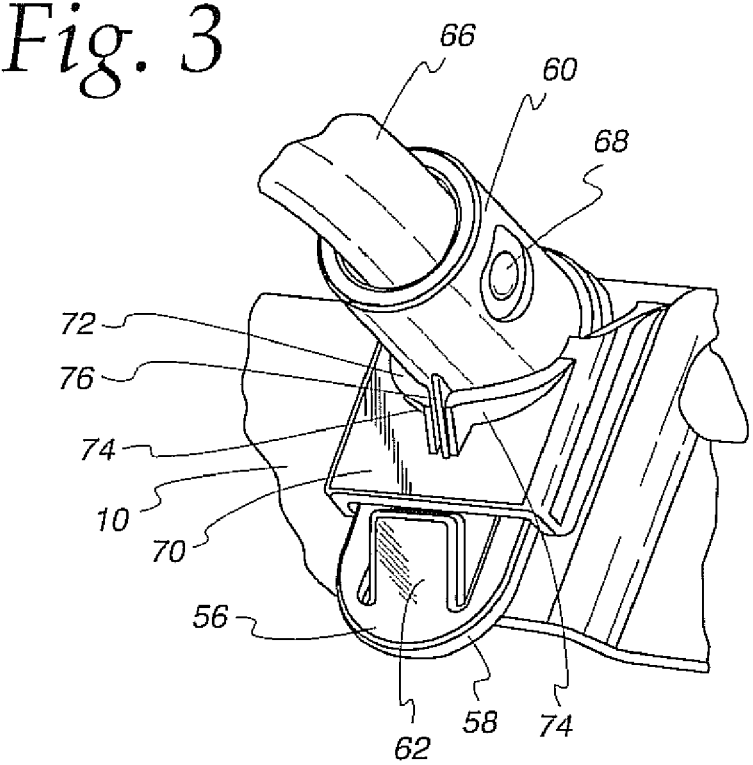
FIG. 3 is a close-up view of an example rail and an example stationary accessory mounting clip secured in a bracket of the example primary clip of FIG. 1.

The brackets 50, 52 of FIG. 1 are substantially identical and shown enlarged in FIG. 3. Each is structured to receive a stationary accessory mounting clip 56 which is directly or indirectly coupled to a rail of a frame of an accessory that is intended to remain stationary in use, and/or to receive a rocking accessory mounting clip 80 which is rotatably coupled, directly or indirectly, to a frame of an accessory which is intended to rock in use. Thus, each bracket 50, 52 and mounting clip 56, 80 combination serves to couple an accessory (e.g., in the case of the stationary accessory mounting clip 56, a stationary accessory, or, in the case of the rocking accessory mounting clip 80, a rockable accessory) to the primary clip 10.

An example stationary accessory mounting clip 56 is shown in FIG. 3. The illustrated stationary accessory mounting clip 56 includes a substantially planar body 58 and a cylindrical receiving member 60. The planar body 58 includes a spring button 62 to removably secure the planar body 58 to the bracket 50, 52. The spring button 62 of the illustrated example is implemented by a resilient flange which is cantilevered at an angle from the planar body 58. The cylindrical receiving member 60 of the example of FIG. 3 is structured to receive a rod or rail 66 of an accessory. To this end, the cylindrical receiving member 60 defines a bore for receiving a rivet or other mechanical fastener 68 joining the rail 66 to the stationary accessory mounting clip 56.

Each bracket 50, 52 includes a u-shaped body 70 which cooperates with the primary clip 10 to define an open-ended channel sized to receive a mounting clip 56, 80 associated with an accessory. In the illustrated example, the channel is generally vertically oriented such that a mounting clip 56, 80 may slide down through the open top of the channel and extend out of the bottom of the channel as shown in FIG. 3. When a mounting clip 56, 80 is positioned in the channel, it is captured between the bottom of the u-shaped body 70 and the primary mounting clip 10 as shown in FIG. 3. When so positioned, the spring button 62 engages a bottom surface of the u-shaped body 70 to prevent the mounting clip 56, 80 from being inadvertently withdrawn from the body 70. To withdraw the mounting clip 56, 80 from the bracket 50, 52, a user must depress the spring button 62 until it becomes substantially co-planar with the planar body 58 and then move the mounting clip 56, 80 upward and out of the channel. Because the spring button 62 assumes an angular orientation when it is in its rest position (e.g., the position of FIG. 3), the spring button 62 is automatically depressed by the u-shaped body 70 when the mounting clip 56, 80 is inserted into the bracket 50, 52.

In order to receive the cylindrical receiving member 60 of the mounting clip 56, 80, the brackets 50, 52 of FIGS. 1 and 3 are provided with a cup 72. In the illustrated example, the cup 72 is defined by two rounded brackets 74. The brackets 74 of the illustrated example are symmetrical with respect to each other and, as most easily seen in FIG. 3, are separated by a small distance to define a slot. The cylindrical receiving member 60 of the mounting clip 56, 80 includes a downwardly extending strut or flange 76 which is sized and positioned to enter the slot defined by the rounded brackets 74. The rounded brackets 74 and the strut 76, thus, cooperate to ensure the cylinder of the cylindrical receiving member 60 does not rotate within the cup 72 and, thus, that the mounting clip 56, 80 does not rotate within the bracket 50, 52.

Figure 4:
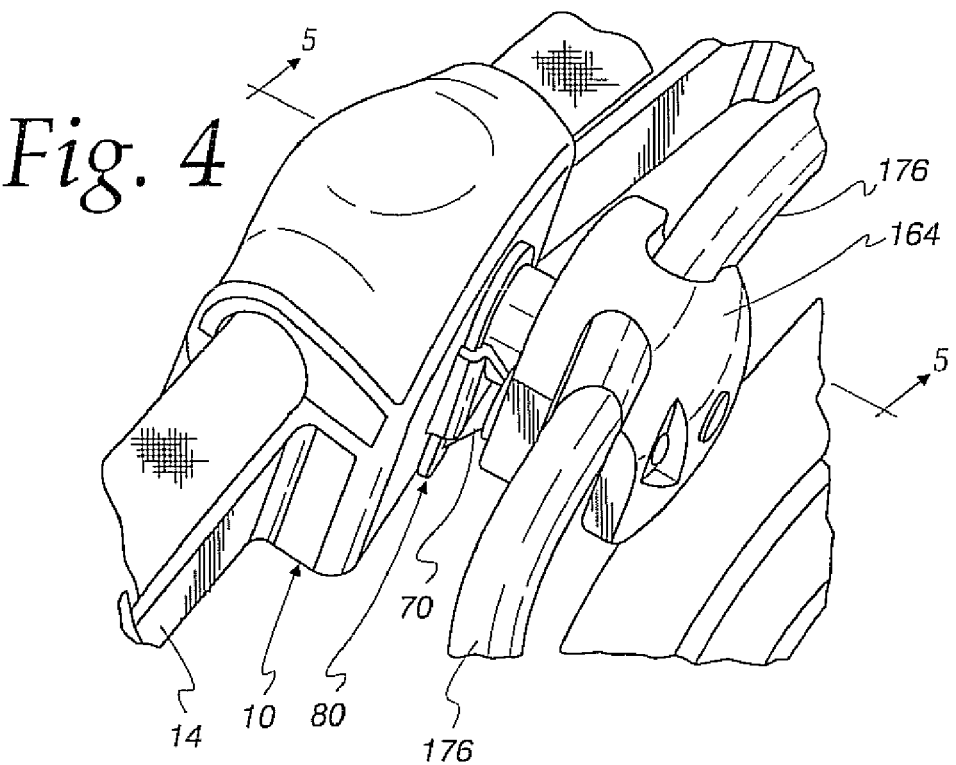
FIG. 4 is a close up view of the primary clip of FIG. 1, but showing an example rocking mounting clip secured to the hub of the primary clip.
Figure 5:
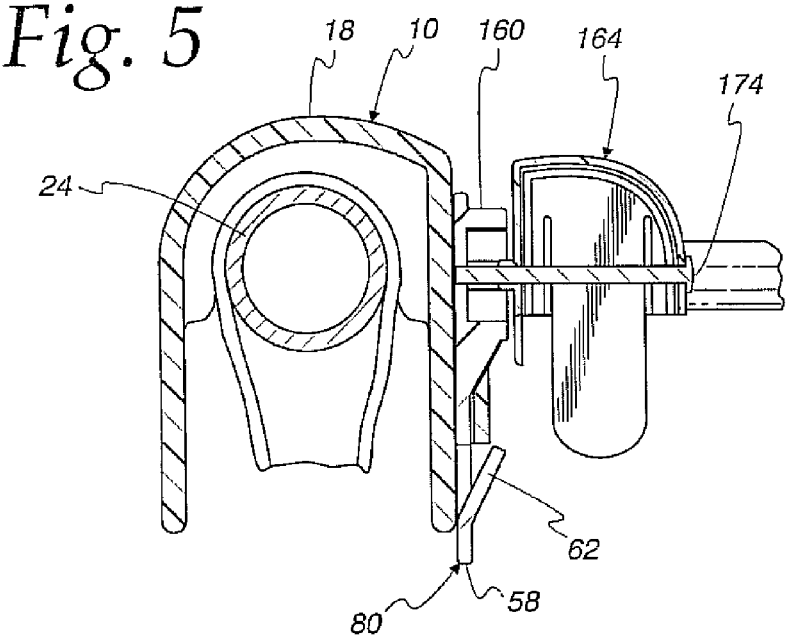
FIG. 5 is a cross-sectional view of the primary clip and rocking mounting clip of FIG. 4 taken along line 5-5 of FIG. 4 and showing the primary clip mounted to an example top rail of an example play yard.

As discussed above, the stationary accessory mounting clip 56 is structured to couple a stationary (i.e., non-rocking) accessory to the primary clip 10. In contrast, the rocking accessory mounting clip 80 is provided to couple an accessory which is intended to be rocked relative to the primary clip 10. An example rocking accessory mounting clip 80 is illustrated in FIGS. 4-5a.

Figure 5A:
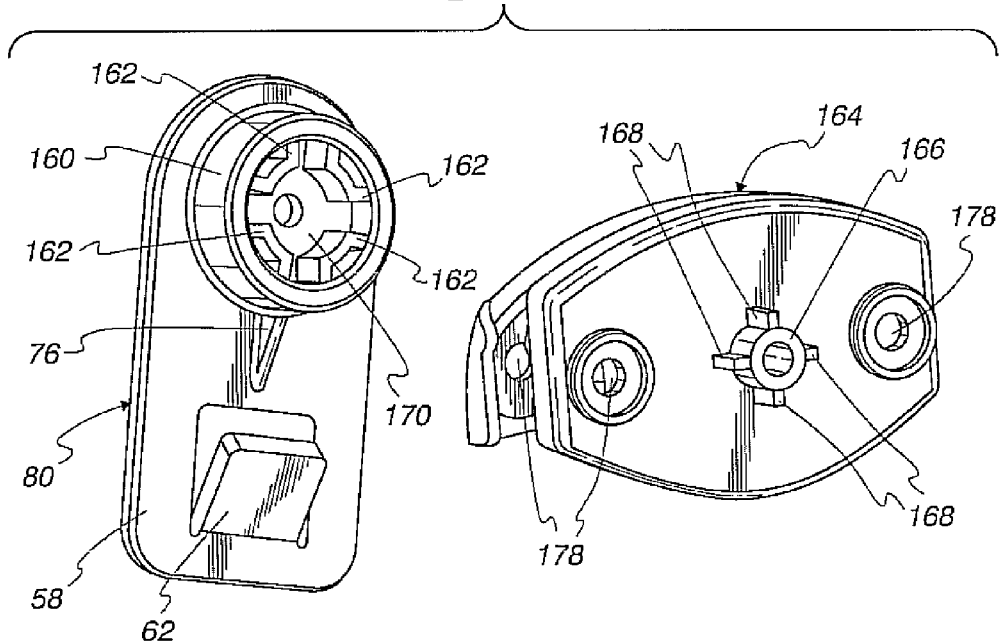
FIG. 5a is an enlarged exploded view of the example rocking mounting clip and connecting hub of FIGS. 4 and 5.

Turning first to FIG. 5a, it can be seen that much of the structure of the rocking accessory mounting clip 80 is identical to the structure of the stationary accessory mounting clip 56. Therefore, much of the rocking accessory mounting clip 80 has already been described in the corresponding description of the stationary accessory mounting clip 56. In the interest of brevity, the description of structures of the rocking accessory mounting clip 80 which have previously been described will not be repeated here. Instead, the interested reader is referred to the above-description of the example stationary accessory mounting clip 56 for a more detailed discussion of those structures. To facilitate this process, like structures are labeled with like reference numerals in the descriptions of the stationary accessory mounting clip 56 and the rocking accessory mounting clip 80.

As shown in FIG. 5a, the example rocking accessory mounting clip 80 includes a planar body 58, a spring button 62, a cylindrical receiving member 160 and a strut or flange 76 supporting the cylindrical receiving member 160 relative to the planar body 58. However, whereas the cylindrical receiving member 60 of the stationary mounting clip 56 was substantially hollow for receiving a rod or rail of an accessory, the cylindrical receiving member 160 of the rocking accessory mounting clip 80 includes a plurality of partitions 162 to limit rocking movement of an accessory relative to the cylindrical receiving member 160.

More specifically, the rocking accessory mounting clip 80 is coupled to a rocking hub 164. In the example of FIG. 5a, the rocking hub 164 includes a cylindrical projection 166 and a plurality of lugs 168 radiating from the cylindrical projection 166. The cylindrical projection 166 is received within a cylindrical chamber 170 defined in the cylindrical receiving member 160. The lugs 168 are received in apertures defined between the partitions 162 of the cylindrical receiving member 160. The partitions 162 and the lugs 168 cooperate to limit rotation of the rocking hub 164 relative to the cylindrical receiving member 160 and, thus, relative to the rocking accessory mounting clip 80.

As shown in FIG. 5, a rivet 174 is threaded through the rocking hub 164 and the cylindrical receiving member 160 of the rocking accessory mounting clip 80 to secure the rocking accessory mounting clip 80 and the rocking hub 164 together with the lugs 168 within their respective apertures in the cylindrical receiving member 160. Thus, when the rocking accessory mounting clip 80 is secured in a bracket 50, 52 as shown, for example, in FIGS. 4 and 5, the rocking hub 164 is free to rock back and forth within a predetermined range of movement defined by the interaction of the lugs 168 and partitions 162. The rails 176 of a rocking accessory are mounted to the rocking hub 164 via mechanical fasteners as shown in FIG. 4. To this end, the rocking hub 164 defines apertures 178 for receiving the fasteners joining the rails 176 to the hub 164 (see FIG. 5a). Persons of ordinary skill in the art will appreciate that any known mechanical fastener (e.g., a bolt, screw, nail, etc.) can be used to join the rails 176 and the hub 164.

Although the rocking accessory mounting clip 80 is shown mounted to a bracket 50 located on the hub 18 of the primary clip 10, persons of ordinary skill in the art will readily appreciate that the rocking accessory mounting clip 80 could be used with a bracket 50, 52 located at another position on the primary clip 10. For example, the rocking accessory mounting clip 80 could alternatively be used with the bracket 52 located on the joining member 46.

Figure 6A:
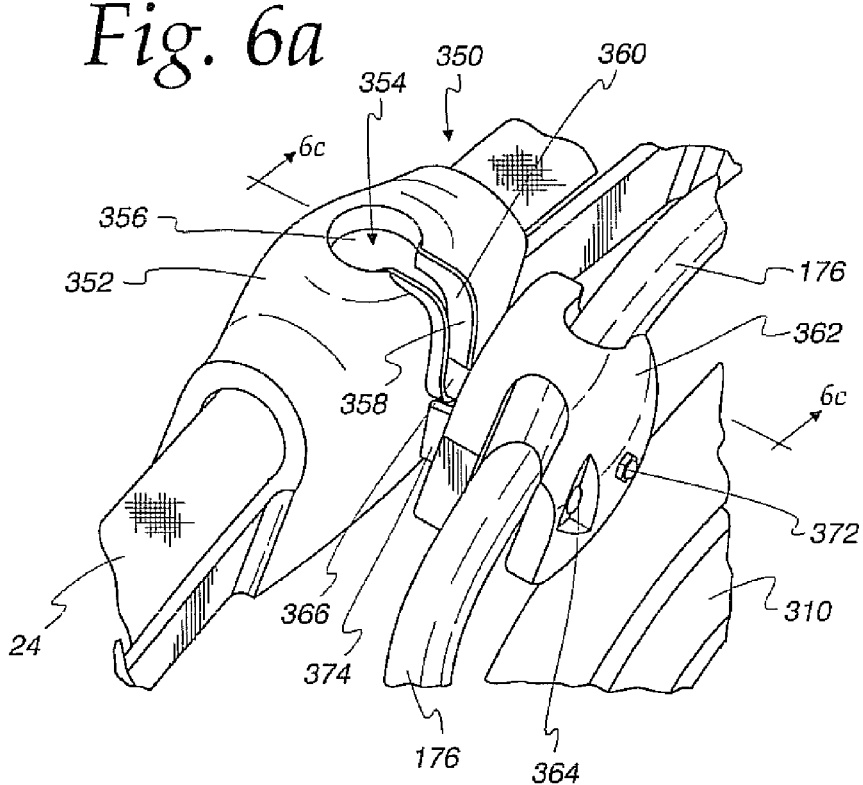
FIG. 6a is an enlarged view of a second example rockable connector shown secured to an example rail of an upper frame of an example play yard.
Figure 6B:
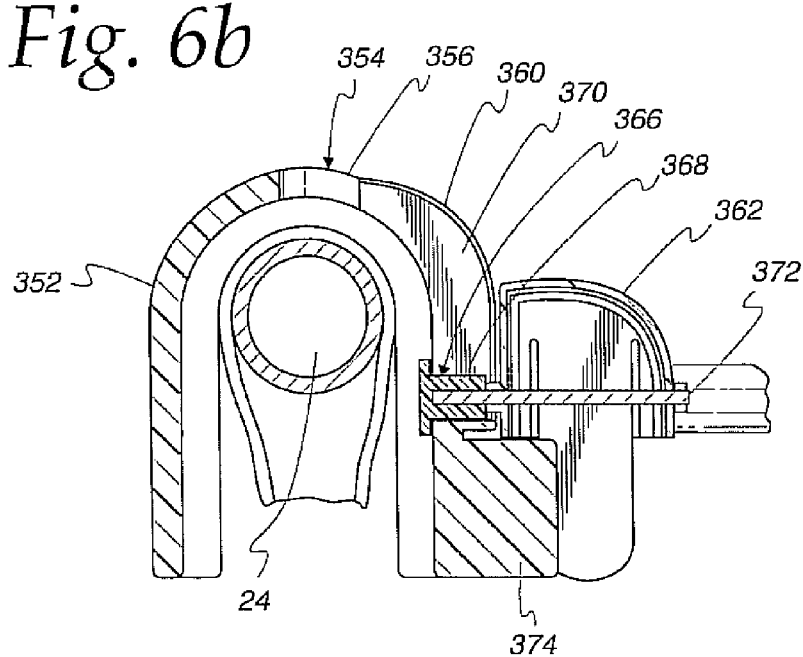

Another example primary clip 350 is shown in FIGS. 6a-6b. The example primary clip 350 of FIGS. 6a-6b is disposed over a top rail 24 of an example play yard or crib and is structured to rotatably mount a rocking accessory to the play yard or crib. To this end, the primary clip 350 has a hub 352 in which an opening 354 is formed. The opening 354 includes an upper opening 356 and a lower opening 358 that is located below the upper opening 356. The upper and lower openings 356, 358 are in communication via a u-shaped flange 360.

A portion of an example rockable bassinet 310 is shown in FIG. 6a. The example rockable bassinet 310 has top rails 176 that are connected in a rocking hub 362 through mechanical fasteners 364. The rocking hub 362 is similar to the rocking hub 164 of FIG. 4. However, the rocking hub 362 has a cylindrical spindle 366 projecting from it. The spindle 366 includes a cylindrical shaft 368. The free end of the spindle 366 terminates in a lug 370, which, in the illustrated example, is a flattened cylindrical piece that has a larger diameter than the shaft 368. The other end of the spindle 366 is connected to the rocking hub 362 by a fastener 372, which traverses the entire rocking hub 362 and is inserted into the shaft 368 of the spindle 366, as shown in FIG. 6b. The fastener 372 defines the axis of rotation for the rocking bassinet 310 and can be implemented by a nail, screw, rivet, bolt or any other mechanical fastener.

To attach the rocking hub 362, and consequently, the rocking bassinet 310, to the primary clip 350, the lug 370 of the spindle 366 is inserted into the upper opening 356 of the primary clip 350. The spindle 366 and the rocking hub 362 are moved downward so that the shaft 368 of the spindle 366 passes through the flange 360 and is rotatably mounted in the lower opening 358. To prevent the lug 370 from withdrawing from the lower opening 358 and to rotatably secure the spindle 366 and the rocking hub 362 to the clip 350, the diameter of the lug 370 is larger than the diameter of lower opening 358. The rounded circumference of the shaft 368 of the spindle 366 supports the rocking bassinet 310 on the flange 360 at the bottom of the lower opening 358. The rounded shape of the lower opening 358 and the shaft 368 of the spindle 366 enable the rocking bassinet 310 to rotate.

To remove the spindle 366 and rocking hub 362 from the primary clip 350, the spindle 366 and rocking hub 362 are lifted upward and passed through the upper opening 356. The diameter of the lug 370 is smaller than the diameter of the upper opening 356, which allows the lug 370 to pass through the upper opening 356. As a result, the entire spindle 366 and rocking hub 362 combination can be easily removed from the primary clip 350.

To limit the range of rotation of the rocking hub 362 relative to the clip 350, the example rockable connection of FIGS. 6a-6b is also provided with a motion limiter 374. The motion limiter 374 of the illustrated example is a projection extending from the face of the primary clip 350 below the lower opening 358. The motion limiter 374 extends into a recess formed in the rocking hub 362. The sides of the recess engage the motion limiter 374 at either end of the range of rotation of the rockable sleeping compartment 310, thus limiting the rotation of the rockable sleeping compartment 310 to a predetermined range or angle.

Possible uses for the second primary clip 350 and the hub 362 are described in more detail in U.S. patent application Ser. No. 11/101,821, which is hereby incorporated herein in full by reference. Furthermore, other than its hub, 352, the primary clip 350 may be substantially identical to the primary clip 10 described above. Thus, it may include engagement members, joining members, side walls, etc. to grip the rails 24 of the play yard.

Another example primary clip 210 to secure one or more accessories (e.g., a changing table, a bassinet, storage compartments, etc.), to a play yard or a crib is shown in FIGS. 7-9. The example primary clip 210 of FIG. 7 includes a hook 212 to engage a top rail 24 of a play yard or crib. A wall 226 depends from the hook 212. The hook 212 has a lip 228 that may be gripped by a user to facilitate removal of the primary clip 210 from the rail 24 of the play yard or crib. Specifically, the lip 228 is pulled away from the rail 224 to increase the distance between the lip 228 of the hook 212 and the wall 226 such that the primary clip 210 can be removed from the rail 24.

The wall 226 provides a surface 214 for securing an accessory (e.g., a bassinet, a changing table, a cradle, a storage compartment, etc) to the primary clip 210. The accessory can be attached to the surface 214 of the wall 226 by any known mechanical or chemical fasteners. For example, the accessory may include soft goods (i.e., a fabric or plastic material such as an enclosure, a side wall, etc.) that is sewn or glued to the wall 226.

In the illustrated example, the primary clip 210 includes a second hook 232. The second hook 232 of the illustrated example is largely identical to the first hook 212 described above. However, in the illustrated example, the second hook 232 is located a distance away from the first hook 212. In the illustrated example, the first hook 212 and the second hook 232 are joined by the wall 226. More specifically, in the primary clip 210 of FIG. 7, the first hook 212, the second hook 232 and the wall 226 are integrally formed.

Although the illustrated primary clip 210 includes two hooks 212, 232 separated by a distance, persons of ordinary skill in the art will readily appreciate that other numbers of hooks would likewise be appropriate. For example, the primary clip 210 could alternatively be shortened to include only one of the hooks 212, 232, the hooks 212, 232 could be joined into one continuous hook, or three or more hooks could alternatively be employed.

As mentioned above, an accessory (e.g., a bassinet, a changing table, a cradle, a storage compartment, etc.) may be chemically or mechanically fastened to the lower sidewall 226 of the primary clip 210. When included, such an accessory will typically be non-removably coupled along the lower portion of the sidewall. For example, the plastic or fabric side wall of a bassinet to be suspended by the primary clip 210 from the rail 24 of a play yard or crib may be sewn or glued to the sidewall 226. In order to permit one or more accessories to be removably mounted to the primary clip 210, the primary clip 210 of the illustrated example is further provided with one or more brackets 50. The accessor(ies) coupled to the bracket(s) 50 may be used in place of, or in addition to, an accessory permanently affixed to the lower portion of the wall 226.

Figure 12:
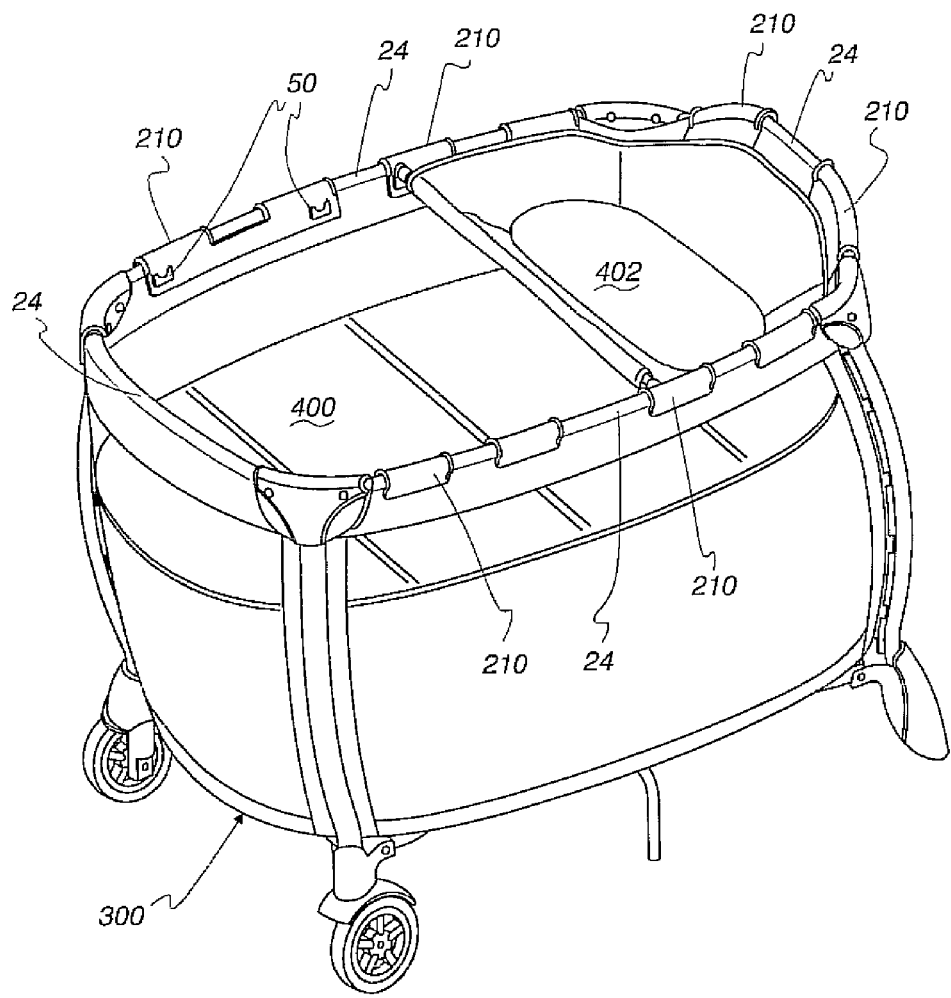
FIG. 12 is perspective view of an example full bassinet suspended on the top rail of an example play yard and an example changing table suspended above the full bassinet using the example primary clip of FIGS. 7-9.

Although the illustrated primary clip 210 includes only one bracket 50, persons or ordinary skill in the art will appreciate that two or more brackets 50 may alternatively be included. For example, a primary clip 210 including two brackets 50 is illustrated in FIGS. 12-13.

The bracket(s) 50 of the example primary clip 210 of FIGS. 7-9 are identical to the brackets 50, 52 of the example primary clip 10 described above. Thus, the description of those structures will not be repeated here.

Either and/or both of the example mounting clips 56, 80 described above may be used with the example primary clip 210 of FIG. 7 to secure an accessory to the rail 24 of a play yard. As discussed above, the mounting clips 56, 80 include a spring button 62 to releasably secure the mounting clip 56, 80 to the bracket 50. The operation of an example spring button 62 of an example stationary accessory mounting clip 56 is shown in detail in FIGS. 8-9. Persons or ordinary skill in the art will appreciate that the following description is also applicable to the example rocking accessory mounting clip 80.

As shown in FIG. 8, as the mounting clip 56 is inserted into the bracket 50, the spring button 62 is cammed inward such that the mounting clip 56 may be slid down through the bracket 50. The spring button 62 is resilient. Therefore, once the mounting clip 56 is fully inserted into the bracket 50, the spring button 62 springs outward in the direction of the arrow 250 shown in FIG. 9. In the extended position of FIG. 9, the spring button 62 will engage the bottom of the bracket 50 if the mounting clip 56 is moved upward (i.e., in the direction opposite the arrow 249 in FIG. 8), thereby preventing the mounting clip 56 from separating from the bracket 50. In order to release the mounting clip 56 from the bracket 50, and thus the accessory rail 252 from the primary clip 210, the spring button 62 must be depressed inward (i.e., in the direction opposite the arrow 250 in FIG. 9) until the spring button 62 fits through the channel of the bracket 50 as the mounting clip 56 is moved upward and clear of the bracket 50.

Example environments of use for the example primary clips 10, 210 and the example mounting clips 56, 80 will now be described with reference to FIGS. 10-13. An example portable play yard 300 is shown in FIG. 10. The play yard 300 has a collapsible frame that includes a plurality of top rails 24 and a plurality of lower rails 306 that are connected by vertical posts 308. In the illustrated example, the play yard 300 is a rounded play yard which is fully described in U.S. patent application Ser. No. 11/063,811, which is hereby incorporated herein by reference in its entirety. However, persons of ordinary skill in the art will appreciate that although the illustrated example play yard 300 is a rounded portable play yard, any other play yard or crib of any other shape or construction (e.g., square, triangular, rounded, portable, not-portable, collapsible, not-collapsible, etc.) could be used in its place.

In the example of FIG. 10, three accessories 310, 312, 314 are suspended from the top rails 24 of the upper frame of the play yard 300 within the volume defined by the play yard 300 using two of the example primary clips 10 described above, two of the example primary clips 210 described above, and two modified versions of the example primary clip 210 described above. In the example illustrated in FIG. 10, the accessories 310, 312, 314 are suspended in side-by-side relation. However, the accessories 310, 312, 314 could be mounted in other configurations and/or orientations.

Figure 11:
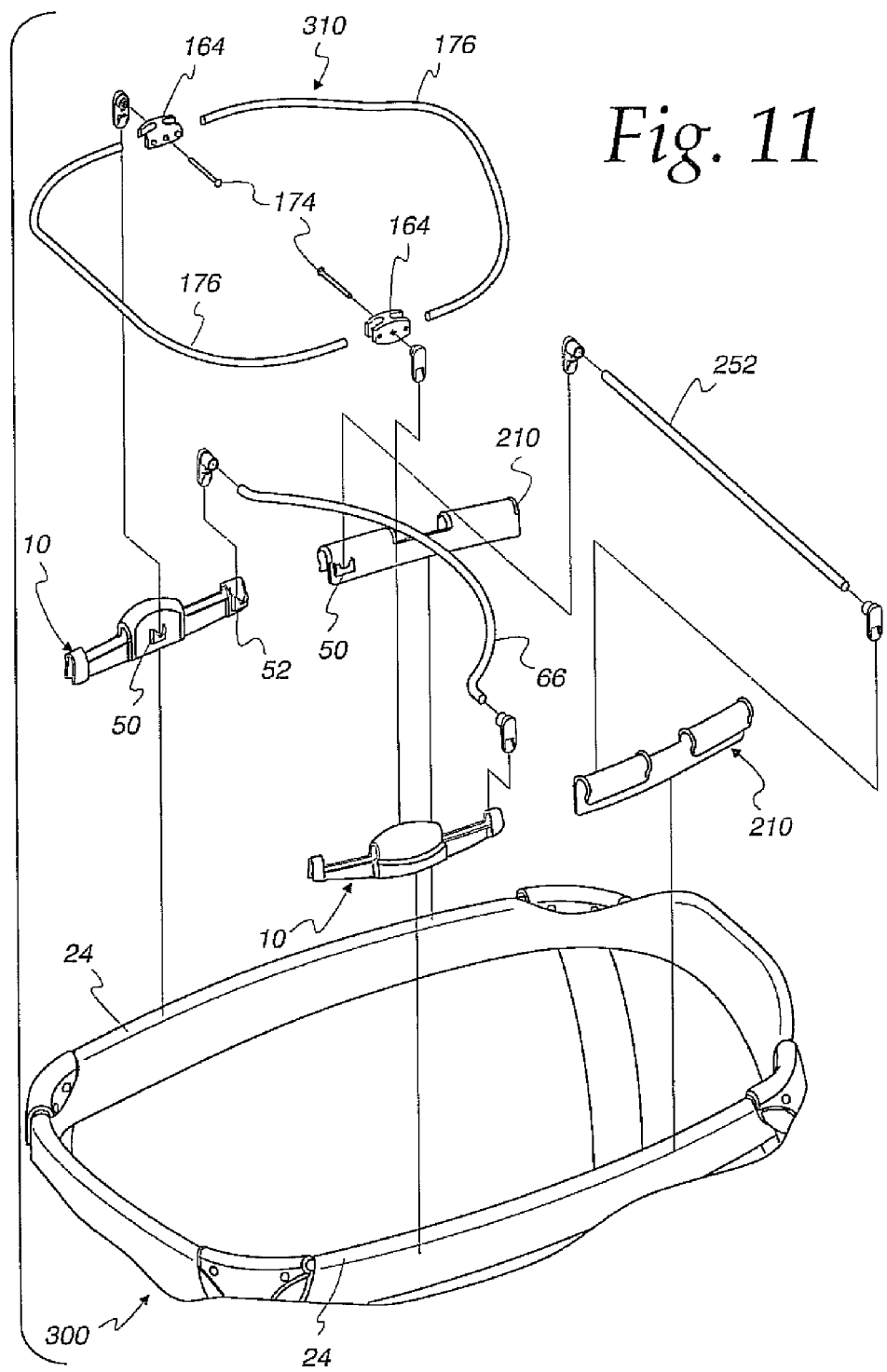
FIG. 11 is an exploded view of the top rail of the play yard and the accessories of FIG. 10 shown with the soft goods of the accessories removed to reveal their frames.

In the example illustrated in FIGS. 10 and 11, the first accessory 310 is implemented by a rocking bassinet 310, the second accessory 312 is implemented by storage compartments 312, and the third accessory 314 is implemented by a changing table 314. However, persons of ordinary skill in the art will appreciate that the accessories 310, 312, 314 could be implemented by other types of structures (e.g., a cradle, a reduced size, stationary bassinet, etc.) and/or a different number of accessories may be employed (e.g., 1, 2, 4, etc.).

The illustrated bassinet 310 provides a sleeping area for a small child or infant. In the illustrated example, the bassinet 310 is implemented as a rocking bassinet such as the rocking bassinet disclosed in U.S. patent application Ser. No. 11/101, 821, which is hereby incorporated herein by reference in its entirety. However, persons of ordinary skill in the art will appreciate that the bassinet 310 could alternatively be constructed as a stationary bassinet.

The illustrated example bassinet 310 is attached to the play yard 300 via two primary clips 10 and two rocking accessory mounting clips 80. As discussed above, the rocking accessory mounting clips 80 rotatably connect the bassinet 310 to respective ones of the primary clips 10, which in turn, are mounted on opposed rails 24 of the play yard 300. More specifically, as shown in FIG. 11, the rocking basinet 310 includes two curved rails 176 defining the oval shape of the bassinet 310. The opposed ends of the curved rails 176 are coupled to respective rocking hubs 164 via mechanical fasteners as explained above in connection with FIG. 4. Rivets 174 are threaded through respective ones of the rocking hubs 164 and the cylindrical receiving member 160 of the respective rocking accessory mounting clips 80 to secure the rocking accessory mounting clips 80 and the rocking hubs 164 together. Thus, when the rocking accessory mounting clips 80 are secured in the brackets 50 of their respective primary clips 10 as shown, for example, in FIGS. 4 and 5, the rocking hubs 164, and, thus, the bassinet 310, are free to rock back and forth within a predetermined range of movement relative to the opposed primary clips 10. In the example of FIG. 1, the rocking accessory mounting clips 80 are secured in the brackets 50 on the hubs 18 of their respective primary clips 10.

The rails 176 of the illustrated example are encased in sleeves defined in the fabric, plastic or other soft goods material that forms the sidewalls and bottom of the bassinet 310. A substantially rigid board and a foam cushion located on top of the board are encased within the soft goods material to create a comfortable bassinet floor. Further details of the rocking bassinet 310 can be found in the above-reference patent application.

The storage compartments 312 of the illustrated example are open top structures generally filling the rounded triangular spaces defined between the straight side of the changing table 314 and the curved side of the rocking bassinet 310. Thus, the storage compartments serve to fill spaces that could otherwise serve as entrapment points. The pockets 312 can be used to store any item(s). For example, the compartments 312 may be used to store ointments, baby wipes, diapers, etc. Although the storage compartments 312 of the illustrated example are open top structures, persons of ordinary skill in the art will appreciate that the compartments 312 could be provided with covers (e.g., zippered flaps) if desired.

In the example of FIG. 11, the storage compartments 312 are defined by soft goods mounted on two rails 66, 252. In the example of FIG. 11, the rail 66 adjacent the bassinet 310 is a curved rail structured to reflect the curved shape of the bassinet 310. The other rail 252 is a straight rail. However, persons of ordinary skill in the art will readily appreciate that rails 66, 252 of other shapes and/or sizes could alternatively be employed.

In the example of FIG. 11, the curved rail 66 is removably mounted to the primary clips 10 and the straight rail 252 is removably mounted to the primary clips 210. More specifically, the opposite ends of the curved rail 66 are each received in the cylindrical receiving member 60 of a respective stationary accessory mounting clip 56 (see FIG. 3). These stationary accessory mounting clips 56 are mounted in the brackets 52 of their respective primary clips 10. The opposite ends of the straight rail 252 are each received in the cylindrical receiving member 60 of a respective stationary accessory mounting clip 56 (see FIGS. 8-9). These stationary accessory mounting clips 56 are mounted in the brackets 50 of their respective primary clips 210.

The rails 66, 252 are received in sleeves of the soft goods defining the storage compartments 312. The soft goods for the storage compartments may be constructed of, for example, fabric, or plastic.

The changing table 314 of the illustrated example provides a support to change a child or infant's clothing or diapers. As shown in FIG. 11, the changing table 314 shares the support rod 252 with the storage compartment 312. Thus, the frame 252 of the changing table 314 is attached to opposite primary clips 210 as explained above in connection with the storage compartments 312.

The side of the illustrated changing table 314 opposite the support rail 252 is supported on the top rails 24 of a short side of the play yard 300 by primary clips 210. In the illustrated example, the primary clips 210 engaging the short side of the play yard 300 are modified to include only one hook 212 and no mounting bracket 50. Thus, two separate primary clips 210 are employed to secure the illustrated changing table 314 to the short side of the play yard 300. However, persons of ordinary skill in the art will appreciate that the two primary clips 210 could alternatively be formed as a single clip 210 such as the primary clip 210 shown in FIG. 7 (although the bracket 50 could be eliminated, if desired). Irrespective of whether one primary clip 210, two primary clips 210, or more than two primary clips 210 are used to couple the changing table 314 to the short side of the play yard 300, the soft goods of the changing table 314 is preferably mechanically or chemically fastened to the wall(s) of those primary clip(s) 210.

In the illustrated example, the soft goods material of the changing table 314 is a flexible fabric, plastic or other material. Like the soft goods used for the bassinet 310 and storage compartments 312, the soft goods of the changing table 314 are preferably stain-resistant and washable or otherwise cleanable. To provide a firm and comfortable surface, the floor 330 of the changing table 314 may comprise a rigid board with a foam cushion that is encased in the soft goods covering. In the example of FIG. 10, the sidewalls of the changing table 314 angle upward from the floor 330 at a gentle angle to provide some depth to the table 314 while enabling easy access to an infant or small child lying on the changing table 314. The side walls of the table 314 are preferably integrally formed with the covering of the soft goods.

As discussed above, the side of the changing table 314 adjacent the center of the play yard 300 is supported by the rail 252. The rail 252 of the illustrated example is enclosed in a sleeve of the fabric or plastic covering of the changing table 314. When the changing table 314 is removed from the top rail 24 of the play yard 300, it is collapsible and foldable, which increases the ease with which the changing table 314 and play yard 300 can be transported and stored.

Although a bassinet 310, storage compartments 312, and a changing table 314 are illustrated in FIGS. 10-11, persons of ordinary skill in the art will readily appreciate that the example primary clips 10, 210 and the example mounting clips 56, 80 described above may be used to secure different numbers and/or types of accessories to the rails 24 of a play yard. For example, the clips 10, 50, 80, 210 may be used to secure a full bassinet, a reduced bassinet, a rocking bassinet, a changing table, a storage compartment, a cradle, and/or other items that would facilitate baby care-taking functions to the rail of a play yard or crib.

For instance, primary clips 210 may be used to secure a full bassinet 400 and a changing table 402 to the top rails 24 of the play yard 300 as shown in FIGS. 12-13. In this example, the changing table 402 is suspended above the full bassinet 400. The full bassinet 400 of FIG. 12 is larger than the bassinet of the prior example. In particular, the example bassinet 400 substantially fills the entire opening of the play yard 300. The full bassinet 400 of FIG. 12 is supported around the perimeter of the top rails 24 by a plurality of primary clips 210. In particular, the side walls of the bassinet 400 are mechanically or chemically fastened to the side walls 226 of the primary clips 210.

The example changing table 402 is similar to the example changing table 314 of FIG. 10. Thus, as shown in FIG. 13, the example changing table 402 includes two primary clips 210 to couple the changing table 402 to a short side of the play yard 300. Each of the primary clips 210 of the example of FIG. 13 includes only one hook 218 and a wall 226 which is chemically or mechanically fastened to the soft goods of the changing table 402. As with the changing table 314, the changing table 402 includes a sleeve 415 which receives the support rod 252. Again, like the changing table 314, the opposite ends of the support rod 252 of the changing table 402 are respectively fixed to stationary accessory mounting clips 56. These mounting clips 56 are respectively removably received in brackets 50 of opposite ones of the primary clips 210.

Unlike the example changing table 314, the example changing table 402 is not coupled to storage compartments 312. However, persons of ordinary skill in the art will readily appreciate that such compartments 312 could be included if desired.

To further couple the example changing table 402 to the primary clips 210, the illustrated changing table 402 is further provided with two flat mounting clips 425. Although only one flat mounting clip 425 is shown in FIG. 13, persons of ordinary skill in the art will readily appreciate that another flat mounting clip similar, but opposite to, the illustrated flat mounting clip 425 is located opposite the flat mounting clip 425.

In the illustrated example, the flat mounting clips 425 include an extended surface 437 and a depending finger 429. The extended surface 437 provides a surface on which the soft goods of the changing table 402 may be chemically or mechanically fastened. The depending finger 429 is structured to engage a respective one of the brackets 50 of the primary clip 210 in a manner analogous to the mounting clips 56, 80 discussed above. To this end, the depending finger 429 is provided with a spring button 62, which functions precisely as the spring buttons 62 explained above to releasably secure the depending finger 429 in its bracket 50.

From the foregoing, persons of ordinary skill in the art will appreciate that primary clips have been disclosed which may be used to secure a variety of accessories on a variety of play yards or cribs. In the example of FIG. 10, three accessories are mounted on a play yard 300 in side-by-side fashion. In the example of FIG. 12, two accessories are mounted on a play yard 300, with one of the accessories (i.e., the changing table 402) mounted above the other accessory (i.e., the full bassinet). Other configurations will be readily apparent to persons of ordinary skill in the art.

Further, although only a changing table 402 and a bassinet 400 are illustrated in FIGS. 12-13, persons or ordinary skill in the art will readily appreciate that there are many other accessories that could be secured to the top rail 24 of the play yard 300, including, e.g., storage compartments, cradles (stationary or rocking), reduced size bassinets (stationary or rocking) and/or other items that would facilitate baby care-taking functions. Any of these accessories could be supported on the top rail 24 of the play yard 300 opposite the changing table 402, even while the bassinet 400 is also supported on the top rail 24.

As mentioned above, the primary clips and/or mounting clips described herein are not limited for use with play yards. Instead, the disclosed primary clips and/or mounting clips may be used to secure accessories to play yards, cribs, cradles, or other structures.

Although certain methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A combination comprising:
   a play yard or a crib; and
   a clip for securing an accessory to a rail of the play yard or the crib, the clip comprising:
      a first engagement member;
      a second engagement member;
      a first joining member joining the first and second engagement members in spaced apart relation such that a first distance between the first and second engagement members is less than a diameter of the rail;
      a second joining member joining the first and second engagement members, the first and second joining members being separated by a second distance, the first and second joining members being structured to overlie the rail while the first and second engagement members are disposed beneath the rail, the first and second joining members and the first and second engagement members defining an opening to receive the rail above the first and second engagement members and beneath the first and second joining members.

2. A combination as defined in claim 1 wherein both of the first and second engagement members engage a bottom of the rail when the clip is secured to the rail.

3. A combination as defined in claim 1 wherein the second joining member comprises a hub.

4. A combination as defined in claim 1 wherein the distance separating the first and second joining members corresponds to a length of the first engagement member.

5. A combination as defined in claim 1 wherein the first and second joining members and the first and second engagement members are integrally formed of a resilient material.

6. A combination as defined in claim 1 wherein the first joining member is located at an end of the first engagement member and an end of the second engagement member.

7. A combination as defined in claim 1 wherein the first joining member comprises first and second side walls respectively coupled to the first and second engagement members, and a cross-member joining the first and second side walls.

8. A combination as defined in claim 7 wherein the first and second sidewalls are separated by a third distance which is greater than the first distance between the first and second engagement members.

9. A combination as defined in claim 8 wherein at least one of the first and second side walls provides a grip to facilitate separating the first and second engagement members.

10. A combination as defined in claim 1 wherein the second joining member comprises a hub joining the first and second engagement members.

11. A combination as defined in claim 10 wherein the hub is coupled to first ends of the first and second engagement members and the first joining member is coupled to second ends of the first and second engagement members.

12. A combination as defined in claim 11 wherein the hub has an opening to receive a spindle of a rockable accessory to be mounted to the clip.

13. A combination as defined in claim 11 further comprising:
    a third engagement member having a first end coupled to the hub;
    a fourth engagement member having a first end coupled to the hub; and
    a third joining member joining the third and fourth engagement members in spaced apart relation such that a third distance between the third and fourth engagement members is less than the diameter of the rail.

14. A combination as defined in claim 13 wherein the third joining member is coupled to second ends of the third and fourth engagement members.

15. A combination as defined in claim 14 wherein the hub, the second joining member and the third and fourth engagement members define a second opening to receive the rail.

16. A combination as defined in claim 11 further comprising a bracket to receive a portion of an accessory to be mounted to the clip.

17. A combination as defined in claim 16 wherein the bracket is located on the hub.

18. A combination as defined in claim 16 wherein the bracket is located on the first joining member.

19. A combination as defined in claim 16 wherein the bracket comprises a body defining a channel to receive a mounting clip associated with an accessory.

20. A combination as defined in claim 19 wherein the mounting clip includes a spring button to removably secure the mounting clip to the bracket.

21. A combination comprising:
    a play yard or a crib; and
    a clip for securing an accessory to a rail of the play yard or the crib, the clip comprising:
       a first engagement member;
       a second engagement member;
       a first joining member joining the first and second engagement members in spaced apart relation such that a distance between the first and second engagement members is less than a diameter of the rail; and
       a bracket to receive a portion of an accessory to be mounted to the clip, wherein the bracket comprises:
          a body defining a channel to receive a mounting clip associated with an accessory; and
          a cup to receive a cylinder.

22. A combination as defined in claim 21 wherein the mounting clip includes a spring button to removably secure the mounting clip to the bracket.

23. A combination as defined in claim 21 wherein the cylinder receives a rod associated with an accessory.

24. A combination as defined in claim 21 wherein the cup defines a slot to receive a flange on the cylinder to prevent rotation of the cylinder in the cup.

25. A combination as defined in claim 21 wherein the cylinder rotatably connects the mounting clip to a rocking accessory.

26. A combination as defined in claim 25 wherein the cylinder includes a partition to limit rocking of the accessory relative to the cylinder.

27. A combination comprising:
    a play yard or a crib; and
    a clip for securing an accessory to a rail of the play yard or the crib, the clip comprising:
       first and second walls, each of the first and second walls having a top surface;
       first and second living hinges joining the first and second walls; and
       an opening defined above the first and second walls and between the first and second hinges to receive the rail such that the top surfaces of the first and second walls engage a lower surface of the rail at positions spaced inward from vertical tangents of the rail.

28. A combination as defined in claim 27 wherein at least one of the first and second living hinges overlies the rail when the rail is in the opening.

29. A combination as defined in claim 28 wherein at least one of the first and second walls is located beneath the rail when the rail is in the opening.

30. A combination comprising:
 first and second child care accessories, the first accessory being a first type of child care accessory and the second accessory being a second type of child care accessory different from the first type of child care accessory; and
 a clip for securing the first and second child care accessories to a rail of a play yard or crib, the clip comprising:
  a hook to engage the rail;
  a wall depending from the hook, the wall having a surface to which the second child care accessory is fastened by a mechanical or chemical fastener to suspend at least a portion of the second child care accessory below the wall; and
  a bracket located on the hook or the wall to secure a rail from the first child care accessory, the bracket having a body defining a channel to receive a mounting clip associated with the first accessory such that the rail projects outwardly from the wall.

31. A combination as defined in claim 30 wherein the second accessory is sewn to the wall.

32. A combination as defined in claim 31 wherein the second accessory is a soft good.

33. A combination as defined in claim 32 wherein the second accessory is a bassinet, a changing table, a storage compartment, or a cradle.

34. A combination as defined in claim 32 wherein the first accessory is a bassinet, a changing table, a storage compartment, or a cradle.

35. A combination as defined in claim 30 wherein the hook includes a grip.

36. A combination as defined in claim 30 wherein the bracket comprises
 a cup to receive a cylinder.

37. A combination as defined in claim 36 wherein the mounting clip includes a spring button to removably secure the mounting clip to the bracket.

38. A combination as defined in claim 36 wherein the cylinder comprises the portion of the mounting clip.

39. A combination as defined in claim 36 wherein the cylinder receives the rail.

40. A combination as defined in claim 36 wherein the cup defines a slot to receive a flange on the cylinder to prevent rotation of the cylinder in the cup.

41. A combination as defined in claim 36 wherein the cylinder rotatably connects the mounting clip to the first accessory.

42. A combination as defined in claim 41 wherein the cylinder includes a partition to limit rocking of the first accessory relative to the cylinder.

43. A combination as defined in claim 30 further comprising a second hook coupled to the wall.

44. A combination as defined in claim 43 wherein the first and second hooks are separated by a distance.

45. A combination as defined in claim 43 wherein the first and second hooks and the wall are integrally formed.

46. For use with a play yard or crib having a rail, an apparatus comprising:
 a first accessory;
 a hook to engage the rail to suspend the first accessory within the play yard;
 a second accessory;
 a bracket coupled to the hook to support the second accessory above the first accessory.

47. An apparatus as defined in claim 46 wherein the first accessory includes a soft good.

48. An apparatus as defined in claim 47 wherein the second accessory comprises a bassinet, a changing table, a storage compartment, or a cradle.

49. An apparatus as defined in claim 46 wherein the first accessory comprises a bassinet, a changing table, a storage compartment, or a cradle.

50. An apparatus as defined in claim 46 wherein the second accessory is coupled to the bracket via a rail.

51. An apparatus as defined in claim 46 wherein at least one of the first and second accessories is rockable while attached to the play yard.

* * * * *